United States Patent
Nakamura et al.

(10) Patent No.: US 11,119,378 B2
(45) Date of Patent: Sep. 14, 2021

(54) DIMMING LAMINATE AND MULTIPLE GLASS

(71) Applicants: AGC INC., Tokyo (JP); AGC GLASS EUROPE, Louvain-la-Neuve (BE); AGC FLAT GLASS NORTH AMERICA, INC., Alpharetta, GA (US); AGC VIDROS DO BRASIL LTDA., Sao Paulo (BR)

(72) Inventors: Shigeru Nakamura, Tokyo (JP); Tetsuya Hiramatsu, Tokyo (JP)

(73) Assignees: AGC INC., Tokyo (JP); AGC GLASS EUROPE, Louvain-la-neuve (BE); AGC FLAT GLASS NORTH AMERICA, INC., Alpharetta, GA (US); AGC VIDROS DO BRASIL LTDA., Sao Paulo (BR)

( * ) Notice: Subject to any disclaimer, the term of this patent is extended or adjusted under 35 U.S.C. 154(b) by 160 days.

(21) Appl. No.: 16/209,963

(22) Filed: Dec. 4, 2018

(65) Prior Publication Data

US 2019/0107762 A1    Apr. 11, 2019

Related U.S. Application Data

(63) Continuation of application No. PCT/JP2017/021192, filed on Jun. 7, 2017.

(30) Foreign Application Priority Data

Jun. 8, 2016 (JP) .............................. JP2016-114526

(51) Int. Cl.
*G02F 1/153* (2006.01)
*G02F 1/163* (2006.01)
(Continued)

(52) U.S. Cl.
CPC .................. *G02F 1/15* (2013.01); *B32B 7/02* (2013.01); *B32B 17/06* (2013.01);
(Continued)

(58) Field of Classification Search
CPC . G02F 1/153; G02F 1/15; G02F 1/163; G02F 1/1506; G02F 1/1508;
(Continued)

(56) References Cited

U.S. PATENT DOCUMENTS 5,244,557 A    9/1993  Defendini et al.
8,482,837 B2   7/2013  Sbar et al.
(Continued)

FOREIGN PATENT DOCUMENTS

EP    1030023 A1    8/2000
JP    S63-298224 A  12/1988
(Continued)

OTHER PUBLICATIONS

"7059 / 7059F | Low alkali barium-borosilicate glass"; Präzisions Glas & Optik GmbH; 1994.*
(Continued)

*Primary Examiner* — Jie Lei
(74) *Attorney, Agent, or Firm* — Foley & Lardner LLP

(57) ABSTRACT

A dimming laminate (10) includes: a dimming substrate (18) in which a dimming function material (16) is provided between two first transparent substrates (12) and (14); and a second transparent substrate (22) that is bonded to one first transparent substrate (12) through an adhesive layer (20). Each of the first transparent substrates (12) and (14) has a different average thermal expansion coefficient at 50-350° C. from that of the second transparent substrate (22). In the dimming laminate (10), a third transparent substrate (26) is bonded to the other first transparent substrate (14) through an adhesive layer (24), and an average thermal expansion
(Continued)

coefficient at 50-350° C. is equal between the third transparent substrate (26) and the second transparent substrate (22).

14 Claims, 9 Drawing Sheets

(51) Int. Cl.
*B32B 17/10* (2006.01)
*G02F 1/15* (2019.01)
*E06B 3/66* (2006.01)
*B32B 17/06* (2006.01)
*B32B 7/02* (2019.01)
*E06B 5/00* (2006.01)

(52) U.S. Cl.
CPC .. *B32B 17/10073* (2013.01); *B32B 17/10761* (2013.01); *E06B 3/66* (2013.01); *E06B 5/00* (2013.01); *G02F 1/153* (2013.01); *G02F 1/163* (2013.01)

(58) Field of Classification Search
CPC ......... G02F 1/1521; B32B 7/02; B32B 17/10; B32B 17/06; B32B 17/10761; B32B 17/10073; E06B 3/66; E06B 5/00
USPC ........ 359/265, 268, 272, 273, 275; 345/105, 345/106
See application file for complete search history.

(56) References Cited

U.S. PATENT DOCUMENTS

| 8,482,838 | B2 | 7/2013 | Sbar et al. |
| 9,182,644 | B2 | 11/2015 | Sbar et al. |
| 9,316,883 | B2 | 4/2016 | Sbar et al. |
| 9,387,648 | B2 | 7/2016 | Dawson-Elli et al. |
| 9,782,949 | B2 | 10/2017 | Dawson-Elli et al. |
| 9,933,681 | B2 | 4/2018 | Yamamoto et al. |
| 2009/0297806 | A1 | 12/2009 | Dawson-Elli et al. |
| 2011/0261429 | A1 | 10/2011 | Sbar et al. |
| 2011/0267672 | A1 | 11/2011 | Sbar et al. |
| 2012/0037229 | A1 | 2/2012 | Dawson-Elli et al. |
| 2012/0192928 | A1 | 8/2012 | Krol et al. |
| 2013/0258437 | A1 | 10/2013 | Sbar et al. |
| 2013/0258438 | A1 | 10/2013 | Sbar et al. |
| 2014/0127857 | A1 | 5/2014 | Chen et al. |
| 2014/0362430 | A1 | 12/2014 | Yamamoto et al. |
| 2014/0370257 | A1 | 12/2014 | Dawson-Elli et al. |
| 2016/0187753 | A1 | 6/2016 | Sbar et al. |
| 2016/0207289 | A1 | 7/2016 | Dawson-Elli et al. |
| 2018/0180964 | A1 | 6/2018 | Yamamoto et al. |

FOREIGN PATENT DOCUMENTS

| JP | H04-265257 A | 9/1992 |
| JP | 2013-521535 T | 6/2013 |
| JP | 2015-014784 A | 1/2015 |
| JP | 5684113 B2 | 3/2015 |
| WO | WO-2016-043164 A1 | 3/2016 |

OTHER PUBLICATIONS

"CorningGlass7059Properties", VIN Karola Instruments, 2003.*
International Search Report (with English Translation) and Written Opinion (in Japanese only) for PCT/JP2017/021192 dated Sep. 12, 2017.
Extended European Search Report dated Jan. 21, 2020 for corresponding Application No. 17810365.1.

* cited by examiner

Fig. 7

| | No. | Interlayer film | Interlayer film thickness | Step | Long side C-D | Short side A-C | Long side A-B | Short side B-D | Oblique side B-C | Oblique side A-D | Substrate Configuration | |
|---|---|---|---|---|---|---|---|---|---|---|---|---|
| Comp. Ex. | 1 | PVB | 0.76 mm | Autoclave | 8.0 | 2.0 | 8.0 | 2.0 | 9.0 | 9.0 | Soda lime glass Thickness: 4 mm | Alkali free glass Thickness: 1.1 mm |
| | 2 | PVB | 3.05 mm | Autoclave | 5.0 | 1.0 | 2.5 | 1.0 | 4.5 | 3.5 | Soda lime glass Thickness: 4 mm | Alkali free glass Thickness: 1.1 mm |
| | 3 | PVB | 3.05 mm | Autoclave | 4.0 | 1.5 | 3.0 | 1.0 | 4.0 | 5.0 | Soda lime glass Thickness: 4 mm | Alkali free glass Thickness: 1.1 mm |
| Ex. | 1 | PVB | 0.76 mm | Autoclave | 0.0 | 0.0 | 0.0 | 0.0 | 0.0 | 0.0 | Soda lime glass Thickness: 4 mm | Alkali free glass Thickness: 1.1 mm |
| | 2 | PVB | 0.76 mm | Autoclave | 1.5 | 0.5 | 1.5 | 0.5 | 1.5 | 1.5 | Soda lime glass Thickness: 4 mm | Alkali free glass Thickness: 1.1 mm |
| Comp. Ex. | 4 | EVA | 0.8 mm | Rubber bag | 9.0 | 2.0 | 9.0 | 2.5 | 12.0 | 10.0 | Soda lime glass Thickness: 4 mm | Alkali free glass Thickness: 1.1 mm |
| | 5 | EVA | 2.0 mm | Rubber bag | 8.0 | 3.0 | 8.0 | 3.0 | 10.0 | 11.0 | Soda lime glass Thickness: 4 mm | Alkali free glass Thickness: 1.1 mm |
| | 6 | EVA | 3.2 mm | Rubber bag | 7.0 | 0.5 | 6.0 | 1.0 | 8.0 | 7.0 | Soda lime glass Thickness: 4 mm | Alkali free glass Thickness: 1.1 mm |
| Ex. | 3 | EVA | 0.8 mm | Rubber bag | 0.0 | 0.0 | 0.5 | 0.0 | 0.5 | 0.0 | Soda lime glass Thickness: 4 mm | Alkali free glass Thickness: 1.1 mm |
| | 4 | EVA | 0.8 mm | Rubber bag | 1.5 | 1.0 | 1.0 | 1.5 | 1.0 | 1.5 | Soda lime glass Thickness: 4 mm | Alkali free glass Thickness: 1.1 mm |

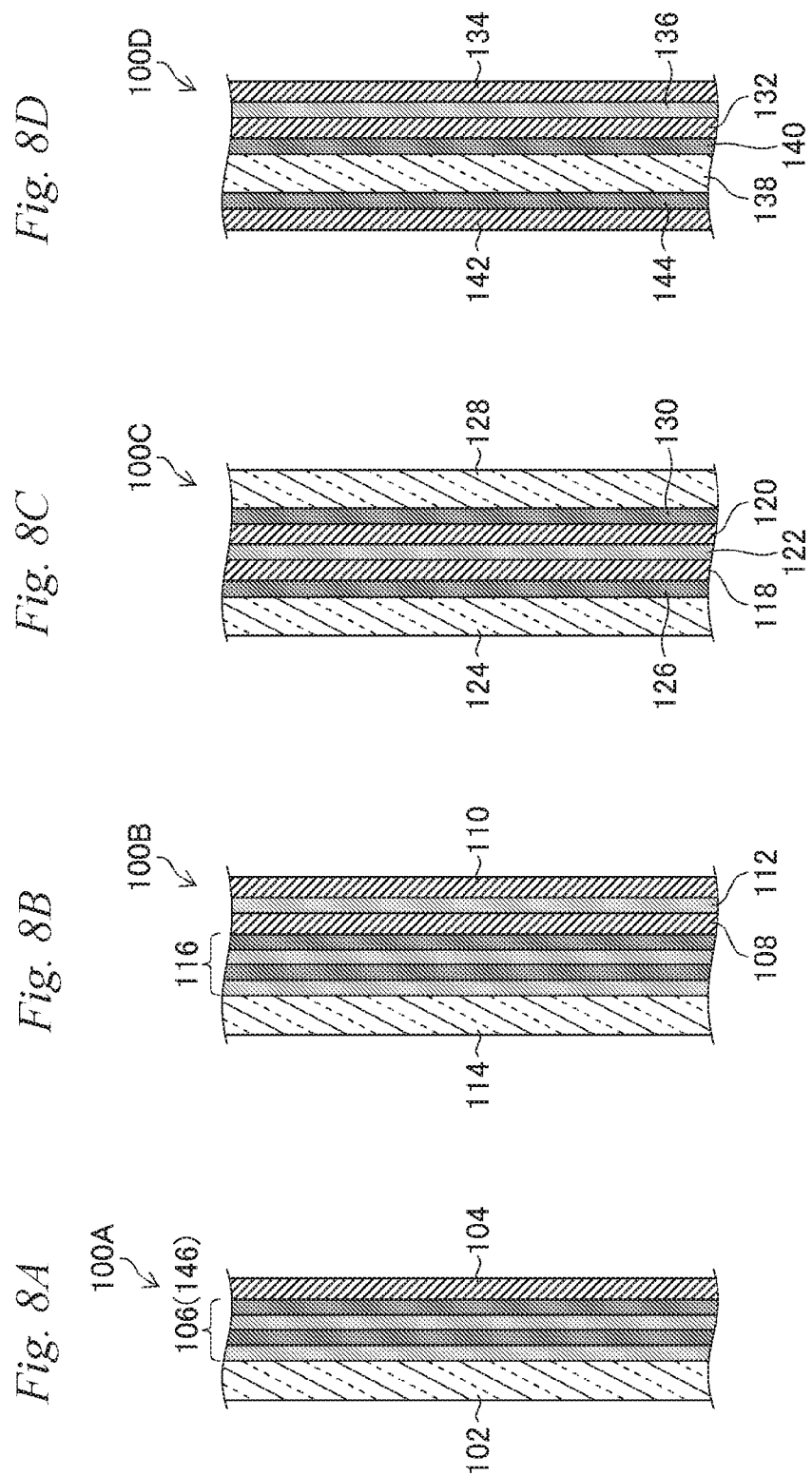

DIMMING LAMINATE AND MULTIPLE GLASS

TECHNICAL FIELD

The present invention relates to a dimming laminate and a multiple glass.

BACKGROUND ART

A dimming laminate (also referred to as a dimmer or a dimming glass) including a diming function material for controlling a transmission state of light by electric control is known. Such a dimming laminate controls a transmission state of light so that a visual field of a user can be shielded or opened, or entrance of infrared rays can be controlled. Thus, the dimming laminate is used as a housing material such as an indoor partition member or an exterior window.

A material using an electrochromic function material is known as the dimming function material for use in the dimming laminate as disclosed in Patent Document 1. The electrochromic function material is disposed on a glass layer. In addition, according to Patent Document 1, soda lime glass is not used as the glass layer, but glass with a low alkali oxide content is used in order to minimize diffusion of alkali such as sodium from the glass layer into the electrochromic function material.

A product with a dimming function disclosed in Patent Document 1 will be described below.

The product according to Patent Document 1 includes a glass layer having a thermal expansion coefficient of $50 \times 10^{-7}/°$ C. or less and a thickness of 4 mm or less, an electrochromic function material disposed on the glass layer, a substrate having a larger thickness than the glass layer, and a laminate layer disposed between the substrate and either the glass layer or the electrochromic function material.

In addition, Patent Document 1 suggests that a transparent glass layer having an alkali oxide content of 10% by mass or less and having a thickness from 0.5 mm to 4 mm is used as the glass layer, polyvinyl butyral is used as the laminate layer, and soda-lime glass is used as the substrate.

That is, Patent Document 1 suggests that alkali free glass is used as the glass layer for preventing migration of an alkali component to the electrochromic function material, soda lime glass is used as the substrate for reinforcing the strength of the alkali free glass, and the alkali free glass and the soda lime glass are bonded by polyvinyl butyral.

BACKGROUND ART DOCUMENT

Patent Document

Patent Document 1: Japanese Patent No. 5684113

SUMMARY OF THE INVENTION

Problems that the Invention is to Solve

A method for manufacturing the product in Patent Document 1 includes a thermal treatment step called an autoclaving step in the same manner as a typical laminated glass manufacturing method. That is, the product according to the Patent Document 1 is manufactured by putting polyvinyl butyral between an alkali free glass and a soda lime glass, setting those glasses between rollers to thereby perform preliminary bonding thereon, then putting the glasses into an autoclave to heat and press the glasses, for example, at 120-150° C. and at 1-1.5 MPa.

However, there is a problem that warpage occurs in the manufactured product due to a difference in thermal expansion coefficient between the alkali free glass and the soda lime glass. As a result, distortion occurs in a reflection image on the product according to Patent Document 1. Thus, there is a problem that the product according to Patent Document 1 has bad appearance. In addition, when the product according to Patent Document 1 is applied to a glass plate forming a multiple glass, there is a problem that the thickness of a hollow layer in the multiple glass is reduced due to the warpage of the glass plate, causing deterioration in heat insulating performance or heat shielding performance, and further causing defective adhesion in a seal material for suppressing moisture permeation to the hollow layer. Incidentally, the average thermal expansion coefficient at 50-350° C. in the alkali free glass is $50 \times 10^{-7}/°$ C. or less, while the average thermal expansion coefficient at 50-350° C. in the soda lime glass is generally $80\text{-}100 \times 10^{-7}/°$ C.

The present invention has been developed in consideration of the foregoing situation. An object of the present invention is to provide a dimming laminate capable of reducing warpage occurring during manufacturing even when the dimming laminate is formed by a laminate of a plurality of substrates different in thermal expansion coefficient, and a multiple glass using the dimming laminate.

Means for Solving the Problems

In order to attain the object of the present invention, a configuration of the present invention provides a dimming laminate including: a single dimming substrate in which a dimming function material is provided between two first transparent substrates; and a second transparent substrate that is bonded to one first transparent substrate of the two first transparent substrates through an adhesive layer, each of the first transparent substrates having a different average thermal expansion coefficient at 50-350° C. from that of the second transparent substrate, in which a third transparent substrate is bonded to the other first transparent substrate of the two first transparent substrates through an adhesive layer, and a difference in average thermal expansion coefficient at 50-350° C. between the third transparent substrate and the second transparent substrate is not higher than $20 \times 10^{-7}/°$ C.

In order to attain the object of the present invention, another configuration of the present invention provides a dimming laminate including: a dimming substrate unit in which at least two dimming substrates each including a dimming function material provided between two first transparent substrates are laminated; and a second transparent substrate that is bonded through an adhesive layer to one first transparent substrate of two first transparent substrates located on an external side of the dimming substrate unit, each of the first transparent substrates having a different average thermal expansion coefficient at 50-350° C. from that of the second transparent substrate, in which a third transparent substrate is bonded through an adhesive layer to the other first transparent substrate of the two first transparent substrates located on the external side of the dimming substrate unit, and a difference in average thermal expansion coefficient at 50-350° C. between the third transparent substrate and the second transparent substrate is not higher than $20 \times 10^{-7}/°$ C.

In any one of the configurations of the present invention, it is preferable that the average thermal expansion coefficient at 50-350° C. is equal between the third transparent substrate and the second transparent substrate. In addition, on this occasion, in the configuration of the present invention, it is preferable that the average thermal expansion coefficient at 50-350° C. in each of the third transparent substrate and the second transparent substrate is higher than the average thermal expansion coefficient at 50-350° C. in each of the first transparent substrates.

In order to attain the object of the present invention, further another configuration of the present invention provides a dimming laminate including: a single dimming substrate in which a dimming function material is provided between two first transparent substrates; and a second transparent substrate that is bonded to one first transparent substrate of the two first transparent substrates through an adhesive layer, each of the first transparent substrates having a different average thermal expansion coefficient at 50-350° C. from that of the second transparent substrate, in which a third transparent substrate is bonded to the second transparent substrate through an adhesive layer, and a difference in average thermal expansion coefficient at 50-350° C. between the third transparent substrate and each of the first transparent substrates is not higher than $10 \times 10^{-7}/°$ C.

In order to attain the object of the present invention, another configuration of the present invention provides a dimming laminate including: a dimming substrate unit in which at least two dimming substrates each including a dimming function material provided between two first transparent substrates are laminated; and a second transparent substrate that is bonded through an adhesive layer to one first transparent substrate of two first transparent substrates located on an external side of the dimming substrate unit, each of the first transparent substrates having a different average thermal expansion coefficient at 50-350° C. from that of the second transparent substrate, in which a third transparent substrate is bonded to the second transparent substrate through an adhesive layer, and a difference in average thermal expansion coefficient at 50-350° C. between the third transparent substrate and each of the first transparent substrates is not higher than $10 \times 10^{-7}/°$ C.

In any one of the configurations of the present invention, it is preferable that the average thermal expansion coefficient at 50-350° C. is equal between the third transparent substrate and each of the first transparent substrates. In addition, on this occasion, in the configuration of the present invention, it is preferable that the average thermal expansion coefficient at 50-350° C. in the second transparent substrate is higher than the average thermal expansion coefficient at 50-350° C. in each of the first transparent substrates and the third transparent substrate.

In any one of the configurations of the present invention, it is preferable that a difference in average thermal expansion coefficient at 50-350° C. between the two first transparent substrates is not higher than $10 \times 10^{-7}/°$ C.

In any one of the configurations of the present invention, it is preferable that the average thermal expansion coefficient at 50-350° C. is equal between the two first transparent substrates.

In any one of the configurations of the present invention, it is preferable that an alkali metal oxide content of each of the first transparent substrates is not higher than 3% in terms of mol % on the basis of oxides.

In order to attain the object of the present invention, further another configuration of the present invention provides a multiple glass in which two glass plates are put separately from each other through a spacer, and circumferential edge portions of the two glass plates are sealed with a seal material, in which at least one glass plate of the two glass plates is the dimming laminate according to any one of the configurations of the present invention.

Advantage of the Invention

According to the present invention, it is possible to provide a dimming laminate capable of reducing warpage occurring during manufacturing even when the dimming laminate is formed by a laminate of a plurality of substrates different in thermal expansion coefficient, and a multiple glass using the dimming laminate.

BRIEF DESCRIPTION OF THE DRAWINGS

FIG. 7 is a summary table of amounts of warpage measured using laminates in Comparative Examples and Examples.

FIGS. 8A to 8D are explanatory views schematically showing configurations of the laminates in Comparative Examples and Examples.

MODE FOR CARRYING OUT THE INVENTION

Preferred embodiments of a dimming laminate and a multiple glass according to the present invention will be described below with reference to the accompanying drawings. In the present specification, assume that a numerical range using a sign "-" includes an upper limit and a lower limit designated by the sign "-".

[Dimming Laminate 10 According to First Embodiment]

Figure 1:
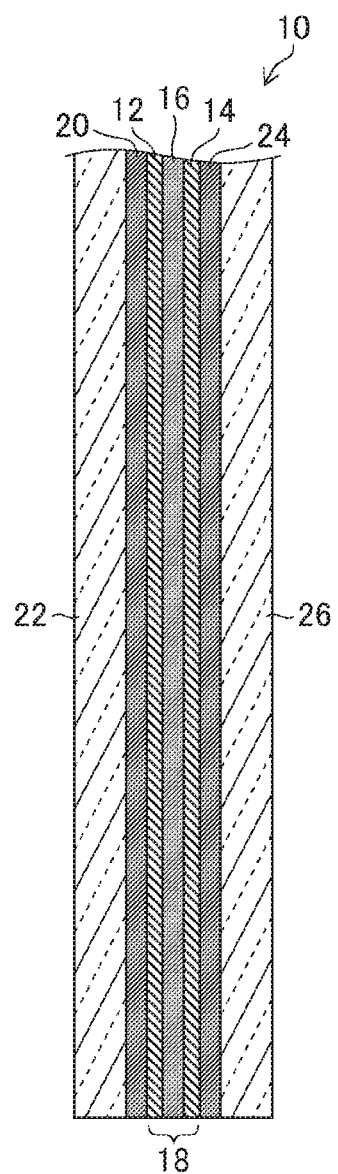
FIG. 1 is a main portion sectional view of a dimming laminate according to a first embodiment.

FIG. 1 is a main portion sectional view of a dimming laminate 10 according to a first embodiment.

A dimming laminate 10 shown in FIG. 1 includes a single dimming substrate 18 in which a dimming function material 16 is provided between two first transparent substrates 12 and 14, and a second transparent substrate 22 that is bonded to one first transparent substrate 12 of the two first transparent substrates 12 and 14 of the dimming substrate 18 through an adhesive layer 20. Each of the first transparent substrates 12 and 14 has a different average thermal expansion coefficient at 50-350° C. from that of the second transparent substrate 22. In the dimming laminate 10, a third transparent substrate 26 is bonded to the other first transparent substrate 14 of the two first transparent substrates 12 and 14 through an adhesive layer 24, and an average thermal expansion coefficient at 50-350° C. is equal between the third transparent substrate 26 and the second transparent substrate 22.

Alkali free glass is used as the first transparent substrates 12 and 14. The alkali free glass is, for example, 0.1-2.0 mm thick. The alkali free glass may be not thinner than 0.5 mm, not thinner than 0.8 mm, or not thinner than 1.0 mm. On the other hand, the alkali free glass may be not thicker than 1.7 mm, not thicker than 1.5 mm, or not thicker than 1.3 mm. In addition, the average thermal expansion coefficient at 50-350° C. in each of the first transparent substrates is preferably not higher than $50\times10^{-7}$/° C., more preferably not higher than $45\times10^{-7}$/° C., further more preferably not higher than $40\times10^{-7}$/° C., especially preferably not higher than $38\times10^{-7}$/° C. On the other hand, the average thermal expansion coefficient at 50-350° C. in each of the first transparent substrates may be not lower than $30\times10^{-7}$/° C., not lower than $32\times10^{-7}$/° C., or not lower than $35\times10^{-7}$/° C. Further, a difference in average thermal expansion coefficient at 50-350° C. between the first transparent substrates 12 and 14 is preferably not higher than $10\times10^{-7}$/° C., more preferably not higher than $5\times10^{-7}$/° C., further more preferably not higher than $1\times10^{-7}$/° C. Most preferably the average thermal expansion coefficient at 50-350° C. is equal between the first transparent substrates 12 and 14. Furthermore, it is preferable that an alkali metal oxide content of each of the first transparent substrates is not higher than 3% in terms of mol % on the basis of oxides. Consequently, migration of an alkali component from the first transparent substrates 12 and 14 to the dimming function material 16 can be suppressed suitably. The alkali metal oxide content is more preferably not higher than 1% in terms of mol % on the basis of oxides, further more preferably not higher than 0.5% in terms of mol % on the basis of oxides. Especially preferably each of the first transparent substrates is substantially free from alkali metal oxide. In the present specification, "substantially free" means that nothing but inevitable impurities mixed from a raw material or the like are contained, that is, not intentionally added. In the present invention, the first transparent substrate that is substantially free from alkali metal oxide, for example, has an alkali metal oxide content not higher than 0.1%. Here, the average thermal expansion coefficient of the glass can be adjusted, for example, by changing the alkali metal oxide content. When the alkali metal oxide content is reduced, the average thermal expansion coefficient can be reduced. Incidentally, "thickness" in the present specification is a thickness including a tolerance according to JIS (Japanese Industrial Standard) R3202:2011.

An electrochromic function material is used as the dimming function material 16 by way of example. However, the dimming function material 16 is not limited thereto. That is, any material can be used as the dimming function material 16 as long as it is a material whose optical property can be changed reversibly. The dimming function material 16 may be a thin film with which at least one transparent substrate of the two first transparent substrates 12 and 14 can be coated, or a solid or gelatinous body that can be disposed between the two first transparent substrates 12 and 14. An SPD (Suspended Particle Device) material, a liquid crystal material, a polymer dispersed liquid crystal material, a photochromic material, and a thermochromic material can be also used as the dimming function material 16 by way of example. The dimming function material 16 is protected from the outside by the two first transparent substrates 12 and 14. Thus, the single dimming substrate 18 is constituted.

Figure 2:
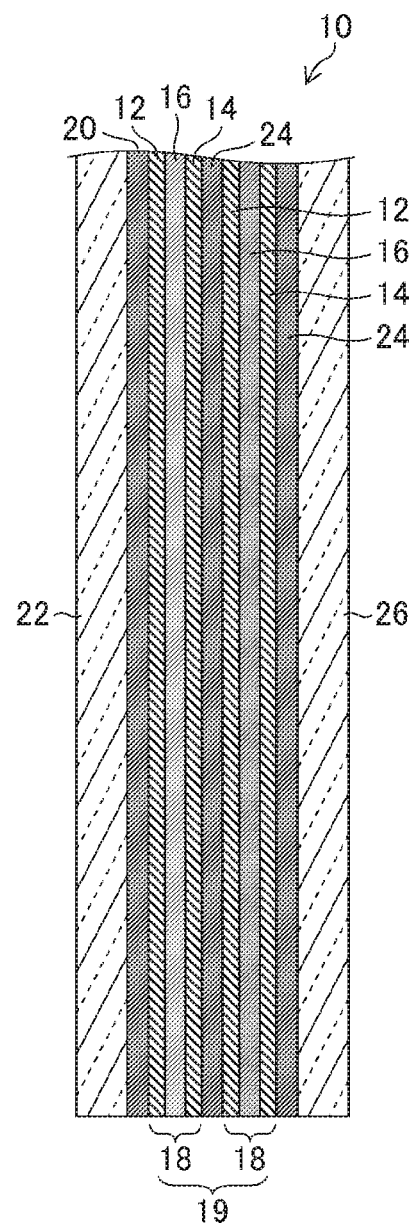
FIG. 2 is a main portion sectional view of a dimming laminate including a dimming substrate unit having two dimming substrates.

FIG. 2 shows another form of a dimming laminate 10 including a dimming substrate unit 19 in which two dimming substrates 18 are laminated.

The dimming laminate 10 shown in FIG. 2 includes: a dimming substrate unit 19 in which two dimming substrates 18 each having a dimming function material 16 provided between two first transparent substrates 12 and 14 are laminated; and a second transparent substrate 22 that is bonded through an adhesive layer 20 to one first transparent substrate 12 of the two first transparent substrates 12 and 14 located on an external side of the dimming substrate unit 19. Each of the first transparent substrates 12 and 14 has a different average thermal expansion coefficient at 50-350° C. from that of the second transparent substrate 22. In the dimming laminate 10, a third transparent substrate 26 is bonded through an adhesive layer 24 to the other first transparent substrate 14 of the two first transparent substrates 12 and 14 located on the external side of the dimming substrate unit 19, and an average thermal expansion coefficient at 50-350° C. is equal between the third transparent substrate 26 and the second transparent substrate 22. In addition, the first transparent substrate 12 and the first transparent substrate 14 opposed to each other internally between the two dimming substrates 18 are bonded to each other through an adhesive layer 24. Incidentally, the number of dimming substrates 18 is not limited to two, but it may be three or more. When a plurality of dimming substrates 18 are provided, resolution for dimming control can be segmented.

Return to FIG. 1. The second transparent substrate 22 functions as a plate for reinforcing the dimming substrates 18. Soda lime glass is used as the second transparent substrate 22. The soda lime glass is, for example, 1.0-12.0 mm thick. The soda lime glass may be not thinner than 2.0 mm, not thinner than 3.0 mm, or not thinner than 3.5 mm. On the other hand, the soda lime glass may be not thicker than 10.0 mm, not thicker than 8.0 mm, not thicker than 6.0 mm, or not thicker than 5.0 mm. In addition, the average thermal expansion coefficient at 50-350° C. in the soda lime glass is preferably $60$-$100\times10^{-7}$/° C. The average thermal expansion coefficient thereof at 50-350° C. may be not lower than $70\times10^{-7}$/° C., or not lower than $80\times10^{-7}$/° C. On the other hand, the average thermal expansion coefficient thereof at 50-350° C. may be not higher than $95\times10^{-7}$/° C., or not higher than $90\times10^{-7}$/° C. Here, the average thermal expansion coefficient at 50-350° C. is measured in a temperature range of 50–350° C. by a differential thermal expansion meter (TMA) according to JIS R3102:1995.

For example, a sheet-like member made of polyvinyl butyral (PVB), ethylene vinyl acetate copolymer (EVA), thermoplastic polyurethane (TPU), or the like can be used as the adhesive layer 20. The adhesive layer 20 is, for example, 0.1-2.0 mm thick. The adhesive layer 20 may be not thinner than 0.5 mm, or not thinner than 0.7 mm. On the other hand, the adhesive layer 20 may be not thicker than 1.5 mm. When such an adhesive layer 20 is used, the first transparent substrate 12 of the dimming substrate 18 and the second transparent substrate 22 can be bonded to each other in an autoclaving step after preliminary press-bonding.

In the same manner as the second transparent substrate 22, soda lime glass is used as the third transparent substrate 26. This soda lime glass is also, for example, 1.0-12.0 mm thick. The soda lime glass may be not thinner than 2.0 mm, not thinner than 3.0 mm, or not thinner than 3.5 mm. On the other hand, the soda lime glass may be not thicker than 10.0 mm, not thicker than 8.0 mm, not thicker than 6.0 mm, or not thicker than 5.0 mm. In addition, the average thermal expansion coefficient at 50-350° C. in the third transparent substrate 26 is $60$-$100\times10^{-7}$/° C. The average thermal expansion coefficient thereof at 50-350° C. may be not lower than $70\times10^{-7}$/° C., or not lower than $80\times10^{-7}$/° C. On the other hand, the average thermal expansion coefficient thereof at 50-350° C. may be not higher than $95\times10^{-7}$/° C., or not higher than $90\times10^{-7}$/° C.

In the same manner as the adhesive layer 20, a sheet-like member made of polyvinyl butyral, ethylene vinyl acetate copolymer, thermoplastic polyurethane, or the like can be used as the adhesive layer 24. The adhesive layer 24 is also, for example, 0.1-2.0 mm thick. When such an adhesive layer 24 is used, the first transparent substrate 14 of the dimming substrate 18 and the third transparent substrate 26 can be bonded to each other in an autoclaving step after preliminary press-bonding. In this manner, the dimming laminate 10 according to the embodiment is manufactured. Incidentally, it is preferable that the preliminary press-bonding of the second transparent substrate 22 and the third transparent substrate 26 to the dimming substrates 18 is performed concurrently and their bonding is performed in an autoclaving step to manufacture the dimming laminate 10.

Incidentally, the manufacturing process of the dimming laminate 10 includes a preliminary press-bonding step prior to the autoclaving step. In the preliminary press-bonding step, preliminary press-bonding is performed as follows. That is, the dimming laminate 10 in which bonding by the adhesive layers 20 and 24 has not been performed yet is put into a rubber bag, and the rubber bag is connected to a depressurization system so that the dimming laminate 10 can be kept at a heating temperature of 80-130° C. for a predetermined time under an environment depressurized by several hundreds of mmHg. After the preliminary press-bonding step is terminated, the air pressure inside the rubber bag is returned to the outside air pressure, and the autoclaving step is carried out. When the raw material of the adhesive layers 20 and 24 is, for example, ethylene vinyl acetate copolymer (EVA), the dimming laminate 10 may be manufactured only by the preliminary press-bonding step using the rubber bag. Further, the dimming laminate 18 heated to 50-130° C. may be passed between upper and lower nipper rolls to thereby apply pressure to the dimming laminate 18 and perform preliminary press-bonding thereon.

In the dimming laminate 10 thus configured according to the first embodiment, deformation caused by bonding in the preliminary press-bonding step or the autoclaving step (e.g. heating temperature: 120-150° C., pressure: 1-1.5 MPa, time: 10 minutes), that is, a warp of the dimming laminate 10 is controlled by the difference in thermal expansion coefficient between the second transparent substrate 22 and the third transparent substrate 26 disposed on the opposite sides of the dimming substrates 18.

Here, in the product according to Patent Document 1, there is a large difference in thermal expansion coefficient between the alkali free glass and the soda lime glass disposed on the opposite sides. That is, the average thermal expansion coefficient at 50-350° C. in the alkali free glass is not higher than $50\times10^{-7}$/° C., and the average thermal expansion coefficient at 50-350° C. in the soda lime glass is $80\text{-}100\times10^{-7}$/° C. Thus, there occurs at least a difference of $30\times10^{-7}$/° C. Consequently, there occurs a warp in the manufactured product. Specifically, since the amount of thermal expansion in the soda lime glass is larger than the amount of thermal expansion in the alkali free glass, there occurs an arc-shaped warp in which the surface of the soda lime glass not opposed to the alkali free glass is recessed.

In contrast, in the dimming laminate 10 according to the first embodiment, the average thermal expansion coefficient at 50-350° C. is equal between the second transparent substrate 22 and the third transparent substrate 26 disposed on the opposite sides, and hence the amount of thermal expansion is equal between the both. Thus, warpage in the dimming laminate 10 is suppressed.

Thus, according to the dimming laminate 10 in the first embodiment, warpage occurring during manufacturing can be reduced on a large scale because the dimming laminate 10 has a configuration in which the third transparent substrate 26 is laminated on the first transparent substrates 12 and 14 and the second transparent substrate 22 having different thermal expansion coefficients.

In addition, in the dimming laminate 10 according to the first embodiment, it is preferable that a difference in thickness between the first transparent substrate 12 and the first transparent substrate 14 is not larger than 1 mm. Accordingly, warpage in the dimming laminate 10 is suppressed. The difference in thickness between the first transparent substrate 12 and the first transparent substrate 14 is more preferably not larger than 0.5 mm, or further more preferably not larger than 0.1 mm. On the other hand, a difference in thickness between the second transparent substrate 22 and the third transparent substrate 26 is preferably not larger than 1 mm. Accordingly, warpage in the dimming laminate 10 is suppressed. The difference in thickness between the second transparent substrate 22 and the third transparent substrate 26 is more preferably not larger than 0.5 mm, or further more preferably not larger than 0.1 mm.

In addition, in the dimming laminate 10 according to the first embodiment, the average thermal expansion coefficient at 50-350° C. is equal between the second transparent substrate 22 and the third transparent substrate 26 disposed on the opposite sides, while the thermal expansion coefficient of each of the second transparent substrate 22 and the third transparent substrate 26 is larger than that of each of the first transparent substrates 12 and 14, and warpage in the dimming laminate 10 is suppressed. Thus, compressive stress occurs easily in each dimming substrate 18. It is therefore possible to suppress heat cracking in the dimming laminate 10 in use.

Although the second transparent substrate 22 and the third transparent substrate 26 equal in average thermal expansion coefficient at 50-350° C. are used in the dimming laminate 10 according to the first embodiment, the present invention is not limited thereto. It will go well if the difference in average thermal expansion coefficient at 50-350° C. between the second transparent substrate 22 and the third transparent substrate 26 is not higher than $20\times10^{-7}$/° C. In this manner, warpage occurring in the dimming laminate 10 during manufacturing can be reduced so that a reflection image having no distortion can be obtained, as compared with the product according to Patent Document 1. In addition, the dimming laminate 10 according to the first embodiment may be applied to at least one glass plate of two glass plates constituting a multiple glass (see FIG. 5) as will be described later. Even in this case, warpage in the dimming laminate 10 can be reduced not to affect the heat insulating performance or heat shielding performance of the multiple glass, and defective adhesion in a seal material for suppressing moisture permeation to a hollow layer can be prevented. Incidentally, the difference in average thermal expansion coefficient at 50-350° C. between the second transparent substrate 22 and the third transparent substrate 26 is preferably not higher than $10\times10^{-7}$/° C., more preferably not higher than $5\times10^{-7}$/° C., further more preferably not higher than $2\times10^{-7}$/° C., or especially preferably not higher than $1\times10^{-7}$/° C.

[Dimming Laminate 30 According to Second Embodiment]

Figure 3:
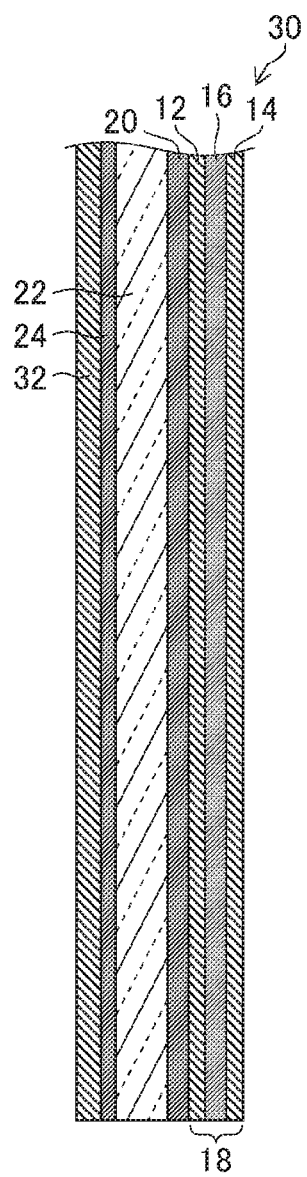
FIG. 3 is a main portion sectional view of a dimming laminate according to a second embodiment.

FIG. 3 is a main portion sectional view of a dimming laminate 30 according to a second embodiment. The dimming laminate 30 according to the second embodiment will be described as follows. That is, members the same as those in the dimming laminate 10 according to the first embodiment shown in FIG. 1 are referenced correspondingly, and their description will be omitted.

The dimming laminate 30 includes: a single dimming substrate 18 in which a dimming function material 16 is provided between two first transparent substrates 12 and 14; and a second transparent substrate 22 that is bonded to one first transparent substrate 12 of the two first transparent substrates 12 and 14 of the dimming substrate 18 through an adhesive layer 20. Each of the first transparent substrates 12 and 14 has a different average thermal expansion coefficient at 50-350° C. from that of the second transparent substrate 22. In the dimming laminate 30, a third transparent substrate 32 is bonded to the second transparent substrate 22 through an adhesive layer 24, and an average thermal expansion coefficient at 50-350° C. is equal between the third transparent substrate 32 and each of the first transparent substrates 12 and 14.

Alkali free glass is used as the third transparent substrate 32 in the same manner as the first transparent substrates 12 and 14. The alkali free glass is, for example, 0.1-4.0 mm thick, but it is not limited thereto. The alkali free glass may be not thinner than 0.5 mm, not thinner than 0.8 mm, or not thinner than 1.0 mm. On the other hand, the alkali free glass may be not thicker than 1.7 mm, not thicker than 1.5 mm, or not thicker than 1.3 mm. In addition, the average thermal expansion coefficient at 50-350° C. in the alkali free glass is preferably not higher than $50\times10^{-7}$/° C., more preferably not higher than $45\times10^{-7}$/° C., further more preferably not higher than $40\times10^{-7}$/° C., especially preferably not higher than $38\times10^{-7}$/° C. On the other hand, the average thermal expansion coefficient at 50-350° C. in the alkali free glass may be not lower than $30\times10^{-7}$/° C., not lower than $32\times10^{-7}$/° C., or not lower than $35\times10^{-7}$/° C.

As described previously, a warp of the dimming laminate 30 caused by thermal expansion is controlled by the difference in thermal expansion coefficient between each of the first transparent substrates 12 and 14 and the third transparent substrate 32 disposed on the opposite sides of the second transparent substrate 22.

In the dimming laminate 30 according to the second embodiment, the average thermal expansion coefficient at 50-350° C. is equal between each of the first transparent substrates 12 and 14 and the third transparent substrate 32 disposed on the opposite sides of the second transparent substrate 22, and hence the amount of thermal expansion is equal between the both. Thus, warpage in the dimming laminate 30 is suppressed.

Thus, according to the dimming laminate 30 in the second embodiment, warpage occurring during manufacturing can be reduced on a large scale because the dimming laminate 30 has a configuration in which the third transparent substrate 32 is laminated on the first transparent substrates 12 and 14 and the second transparent substrate 22 having different thermal expansion coefficients.

In addition, in the dimming laminate 30 according to the second embodiment, a difference between the total thickness of the first transparent substrate 12 and the first transparent substrate 14 (total thickness of all the first transparent substrates 12 and the first transparent substrates 14 when two or more dimming substrates 18 are provided) and the thickness of the third transparent substrate 32 is preferably not larger than 1 mm, more preferably not larger than 0.5 mm, further more preferably not larger than 0.1 mm. Accordingly, warpage in the dimming laminate 30 is suppressed.

In addition, in the dimming laminate 30 according to the second embodiment, the average thermal expansion coefficient at 50-350° C. is equal between each of the first transparent substrates 12 and 14 and the third transparent substrate 32 disposed on the opposite sides of the second transparent substrate 22, while the thermal expansion coefficient of the second transparent substrate 22 is larger than that of each of the first transparent substrates 12 and 14 and the third transparent substrate 32, and the warpage in the dimming laminate 30 is suppressed. Thus, compressive stress occurs easily in the dimming substrate 18. It is therefore possible to suppress heat cracking in the dimming laminate 30 in use.

Although the first transparent substrates 12 and 14 and the third transparent substrate 32 equal in average thermal expansion coefficient at 50-350° C. are used in the dimming laminate 30 according to the second embodiment, the present invention is not limited thereto. It will go well if the difference in average thermal expansion coefficient at 50-350° C. between each of the first transparent substrates 12 and 14 and the third transparent substrate 32 is not higher than $10\times10^{-7}$/° C. Here, when the difference in average thermal expansion coefficient at 50-350° C. between each of the first transparent substrates 12 and 14 and the third transparent substrate 32 is not higher than $10\times10^{-7}$/° C., it means that both the difference in average thermal expansion coefficient at 50-350° C. between the first transparent substrate 12 and the third transparent substrate 32 and the difference in average thermal expansion coefficient at 50-350° C. between the first transparent substrate 14 and the third transparent substrate 32 are not higher than $10\times10^{-7}$/° C. In this manner, the warpage occurring in the dimming laminate 30 during manufacturing can be reduced so that a reflection image having no distortion can be obtained, as compared with the product according to Patent Document 1. In addition, the dimming laminate 30 according to the second embodiment may be applied to at least one glass plate of two glass plates constituting a multiple glass (see FIG. 6) as will be described later. Even in this case, warpage in the dimming laminate 30 can be reduced not to affect the heat insulating performance or heat shielding performance of the multiple glass, and defective adhesion in a seal material for suppressing moisture permeation to a hollow layer can be prevented. Incidentally, the difference in average thermal expansion coefficient at 50-350° C. between each of the first transparent substrates 12 and 14 and the third transparent substrate 32 is more preferably not higher than $5\times10^{-7}$/° C., further more preferably not higher than $2\times10^{-7}$/° C., especially preferably not higher than $1\times10^{-7}$/° C.

Figure 4:
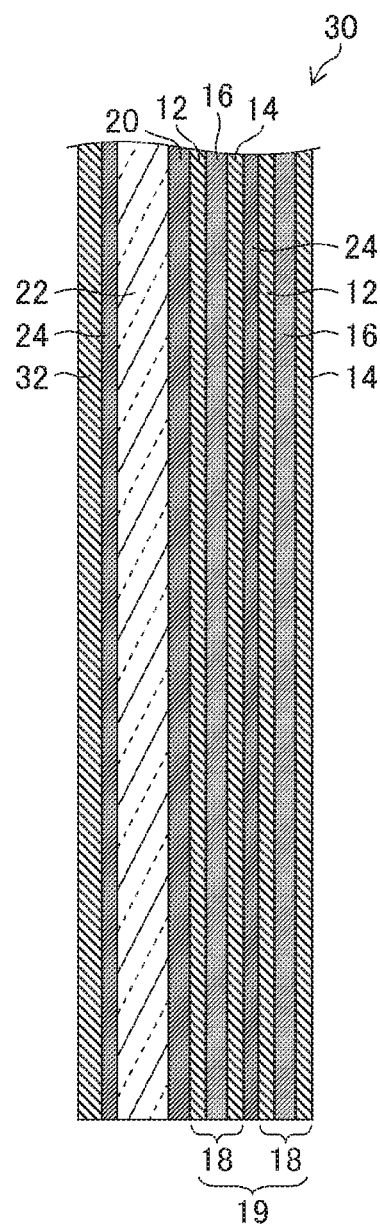
FIG. 4 is a main portion sectional view of a dimming laminate including a dimming substrate unit having two dimming substrates.

FIG. 4 shows another form of a dimming laminate 30 including a dimming substrate unit 19 in which two dimming substrates 18 are laminated.

The dimming laminate 30 shown in FIG. 4 includes: a dimming substrate unit 19 in which two dimming substrates 18 each having a dimming function material 16 provided between two first transparent substrates 12 and 14 are laminated; and a second transparent substrate 22 that is bonded through an adhesive layer 20 to one first transparent substrate 12 of the two first transparent substrates 12 and 14 located on an external side of the dimming substrate unit 19. Each of the first transparent substrates 12 and 14 has a different average thermal expansion coefficient at 50-350° C. from that of the second transparent substrate 22. In the dimming laminate 30, a third transparent substrate 32 is bonded to the second transparent substrate 22 through an adhesive layer 24, and an average thermal expansion coefficient at 50-350° C. is equal between the third transparent substrate 32 and each of the first transparent substrates 12 and 14.

[Multiple Glass 40, 50]

Figure 5:
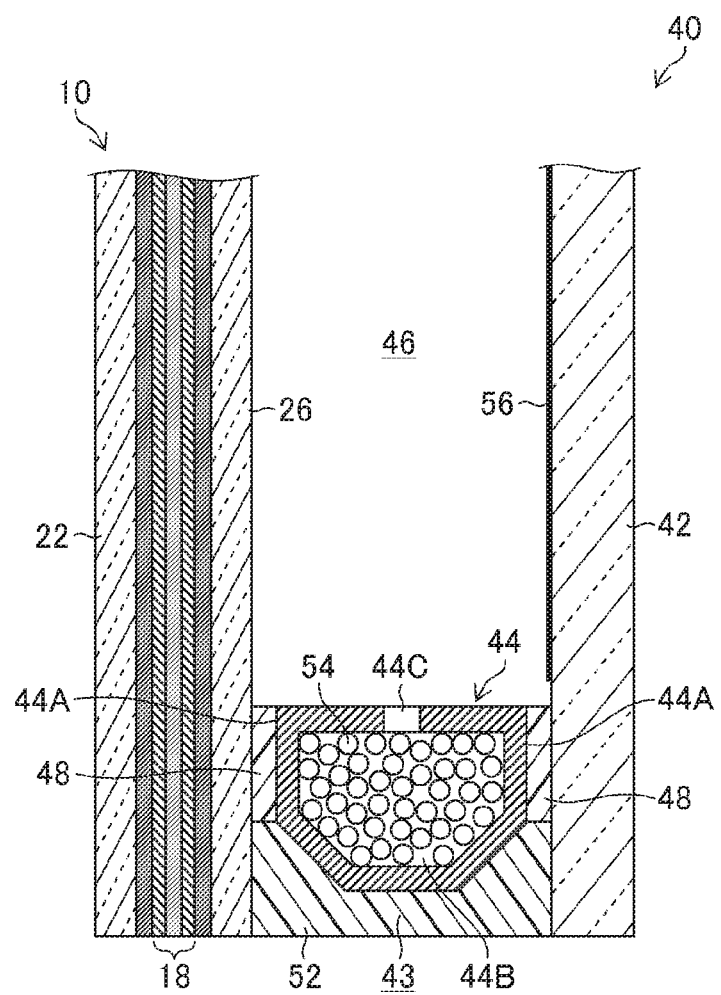
FIG. 5 is a main portion sectional view of a multiple glass to which the dimming laminate according to the first embodiment has been applied.
Figure 6:
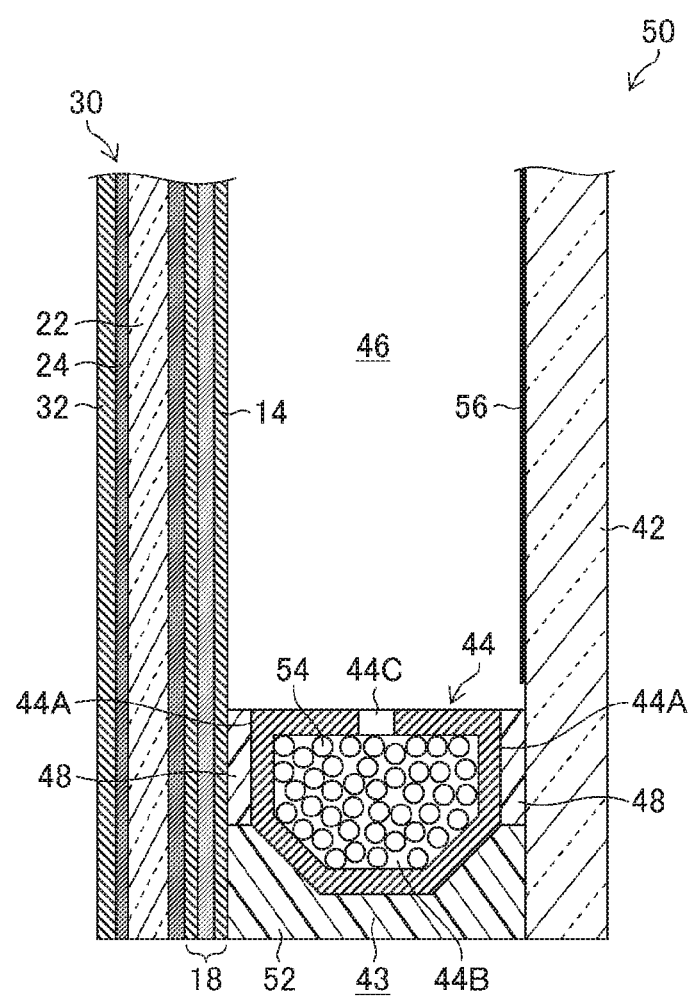
FIG. 6 is a main portion sectional view of a multiple glass to which the dimming laminate according to the second embodiment has been applied.

FIG. 5 is a main portion sectional view of a multiple glass 40 to which the dimming laminate 10 according to the first embodiment has been applied. FIG. 6 is a main portion sectional view of a multiple glass 50 to which the dimming laminate 30 according to the second embodiment has been applied. Since the multiple glasses 40 and 50 shown in FIGS. 5 and 6 have the same main portion configuration, description will be made using the same reference signs. The multiple glass 50 will be described with the signs in parentheses.

The multiple glass 40 (50) includes the dimming laminate 10 (30) configured to be rectangular, a glass plate 42, and a spacer 44 having a frame-like shape. The dimming laminate 10 (30) and the glass plate 42 are placed at a distance from each other by the spacer 44 so as to form a hollow layer 46 between the dimming laminate 10 (30) and the glass plate 42. Opposite sides 44A of the spacer 44 are bonded to the dimming laminate 10 (30) and the glass plate 42 by primary seal materials 48 such as butyl based sealing materials, respectively.

Here, in the case of the dimming laminate 10 shown in FIG. 5, the third transparent substrate 26 of the dimming laminate 10 is bonded to the spacer 44 through the primary seal material 48. In the case of the dimming laminate 30 shown in FIG. 6, the first transparent substrate 14 of the dimming laminate 30 is bonded to the spacer 44 through the primary seal material 48. In the case of the dimming laminate 30, the third transparent substrate 32 may be bonded to the spacer 44 through the primary seal material 48. However, the form in FIG. 6 where the third transparent substrate 32 is disposed to face the outside is preferred in view of protection of the dimming substrate 18.

In addition, a recess portion 43 at edge portion between the dimming laminate 10 (30) and the glass plate 42 is sealed with a secondary seal material 52 such as a silicone based sealing material, a polysulphide based sealing material, a polyurethane based sealing material, or a butyl based sealing material. Thus, the hollow layer 46 put between the dimming laminate 10 (30) and the glass plate 42 is sealed off.

The spacer 44 is made of a hollow pipe material. A hollow portion 44B of the spacer 44 is filled with a drying material 54 such as zeolite. In addition, a through hole 44C through which the hollow portion 44B and the hollow layer 46 can communicate with each other is formed in the spacer 44 so that gas in the hollow layer 46 can be dried by the drying material 54. In addition, the hollow layer 46 may be filled with heat insulating gas (inert gas such as argon gas or krypton gas) as functional gas in advance. When the hollow layer 46 is filled with heat insulating gas in advance, the heat insulating performance of the multiple glass 40 (50) is improved.

Further, the hollow layer 46-side surface of each of the glass plate 42 and the third transparent substrate 26 (first transparent substrate 14) may be coated with a Low-E (Low Emissivity) film 56 as a low radiation film for improving the heat shielding performance or the heat insulating performance. The glass plate 42 may be made of so-called float glass manufactured by a float process. Alternatively, the glass plate 42 may be made of fireproof glass such as wired glass, or laminated glass.

When the dimming laminate 10 (30) is applied to at least one glass plate of the two glass plates constituting the multiple glass 40 (50), a dimming function can be provided for the multiple glass 40 (50). In addition, since warpage in the dimming laminate 10 (30) itself is reduced, influence on the heat insulating performance or the heat shielding performance of the multiple glass 40 (50) can be prevented, and defective adhesion in the primary seal material 48 for suppressing moisture permeation to the hollow layer 46 can be also prevented. Incidentally, the glass plate 42 may be replaced by the dimming laminate 10 (30) in the multiple glass 40 (50).

[Examination Result of Warp in Laminate]

In a data summary table shown in FIG. 7, data of warpage amounts measured using a total of ten laminates according to Comparative Examples 1, 2 and 3, Examples 1 and 2, Comparative Examples 4, 5 and 6, and Examples 3 and 4 are summarized for each laminate. Configurations of the ten laminates will be described below correspondingly to laminates 100A to 100D shown in FIGS. 8A to 8D. In addition, an average thermal expansion coefficient at 50-350° C. in soda lime glass which will be described below is 80-100×$10^{-7}$/° C. On the other hand, an average thermal expansion coefficient at 50-350° C. in alkali free glass which will be described below is 30-40×$10^{-7}$/° C.

<Configuration of Laminate>

The laminate 100A shown in FIG. 8A corresponds to each of laminates in Comparative Examples 1 and 2.

The laminate 100A in each of Comparative Examples 1 and 2 is a laminate manufactured as follows. That is, a soda lime glass 102 having a thickness of 4 mm and an alkali free glass 104 having a thickness of 1.1 mm were laminated on each other through an adhesive layer 106 made of polyvinyl butyral (interlayer: PVB). Those glasses were heated and pressurized in an autoclaving chamber. Thus, the laminate 100A in each of Comparative Examples 1 and 2 was manufactured. The thicknesses of the adhesive layers 106 in Comparative Examples 1 and 2 are 0.76 mm and 3.05 mm respectively.

The laminate 100B shown in FIG. 8B corresponds to a laminate in Comparative Example 3.

The laminate 100B in Comparative Example 3 is a laminate manufactured as follows. That is, two alkali free glasses 108 and 110 each having a thickness of 1.1 mm were laminated on each other through an adhesive layer 112 made of polyvinyl butyral (interlayer: PVB) and having a thickness of 0.76 mm, and one alkali free glass 108 and a soda lime glass 114 having a thickness of 4 mm were laminated on each other through an adhesive layer 116 made of polyvinyl butyral (interlayer: PVB) and having a thickness of 3.05 mm. Those glasses were heated and pressurized in an autoclaving chamber. Thus, the laminate 100B in Comparative Example 3 was manufactured.

Although the dimming function material 16 was absent, the laminate 100B in Comparative Example 3 was evaluated on the assumption that the adhesive layer 112 made of polyvinyl butyral was used in place of the dimming function material 16 and regarded as the dimming function material 16.

The laminate 100C shown in FIG. 8C corresponds to a laminate in Example 1.

The laminate 100C in Example 1 is a laminate manufactured as follows. That is, two alkali free glasses (two first transparent substrates) 118 and 120 each having a thickness of 1.1 mm were laminated on each other through an adhesive layer 122 made of polyvinyl butyral (interlayer: PVB) and having a thickness of 0.76 mm, and one alkali free glass 118 and a soda lime glass (second transparent substrate) 124 having a thickness of 4 mm were laminated on each other through an adhesive layer 126 made of polyvinyl butyral (interlayer: PVB) and having a thickness of 0.76 mm, while the other alkali free glass 120 and a soda lime glass (third transparent substrate) 128 having a thickness of 4 mm were laminated on each other through an adhesive layer 130 made of polyvinyl butyral (interlayer: PVB) and having a thickness of 0.76 mm. Those glasses were heated and pressurized in an autoclaving chamber. Thus, the laminate 100C in Example 1 was manufactured. Although the dimming function material 16 is absent, the amount of warpage is substantially equivalent to that in the dimming laminate 10 according to the first embodiment. That is, the laminate 100C in Example 1 was evaluated on the assumption that the adhesive layer 122 made of polyvinyl butyral was used in place of the dimming function material 16 and regarded as the dimming function material 16.

The laminate 100D shown in FIG. 8D corresponds to a laminate in Example 2.

The laminate 100D in Example 2 is a laminate manufactured as follows. That is, two alkali free glasses (two first transparent substrates) 132 and 134 each having a thickness of 1.1 mm were laminated on each other through an adhesive layer 136 made of polyvinyl butyral (interlayer: PVB) and having a thickness of 0.76 mm, and one alkali free glass 132 and a soda lime glass (second transparent substrate) 138 having a thickness of 4 mm were laminated on each other through an adhesive layer 140 made of polyvinyl butyral (interlayer: PVB) and having a thickness of 0.76 mm, while the soda lime glass 138 and an alkali free glass (third transparent substrate) 142 having a thickness of 1.1 mm were laminated on each other through an adhesive layer 144 made of polyvinyl butyral (interlayer: PVB) and having a thickness of 0.76 mm. Those glasses were heated and pressurized in an autoclaving chamber. Thus, the laminate 100D in Example 2 was manufactured. Although the dimming function material 16 is absent, the amount of warpage is substantially equivalent to that in the dimming laminate 30 according to the second embodiment. That is, the laminate 100D in Example 2 was evaluated on the assumption that the adhesive layer 136 made of polyvinyl butyral was used in place of the dimming function material 16 and regarded as the dimming function material 16.

The laminate 100A shown in FIG. 8A corresponds to a laminate in each of Comparative Examples 4, 5 and 6.

The laminate 100A in each of Comparative Examples 4, 5 and 6 is a laminate manufactured as follows. That is, a soda lime glass 102 having a thickness of 4 mm and an alkali free glass 104 having a thickness of 1.1 mm were laminated on each other through an adhesive layer 146 made of ethylene vinyl acetate copolymer (inter layer: EVA). Those glasses were put into a rubber bag, and heated and depressurized therein. Thus, the laminate 100A in each of Comparative Examples 4, 5 and 6 was manufactured. The thicknesses of the adhesive layers 146 in Comparative Examples 4, 5 and 6 were 0.8, 2.0, and 3.2 mm respectively.

The laminate 100C shown in FIG. 8C corresponds to a laminate in Example 3.

The laminate 100C in Example 3 is a laminate manufactured as follows. That is, two alkali free glasses (two first transparent substrates) 118 and 120 each having a thickness of 1.1 mm were laminated on each other through an adhesive layer 122 made of ethylene vinyl acetate copolymer (inter layer: EVA) and having a thickness of 0.8 mm, and one alkali free glass 118 and a soda lime glass (second transparent substrate) 124 having a thickness of 4 mm were laminated on each other through an adhesive layer 126 made of ethylene vinyl acetate copolymer (inter layer: EVA) and having a thickness of 0.8 mm, while the other alkali free glass 120 and a soda lime glass (third transparent substrate) 128 having a thickness of 4 mm were laminated on each other through an adhesive layer 130 made of ethylene vinyl acetate copolymer (inter layer: EVA) and having a thickness of 0.8 mm. Those glasses were put into a rubber bag, and heated and depressurized therein. Thus, the laminate 100C in Example 3 was manufactured. Although the dimming function material 16 is absent, the amount of warpage is substantially equivalent to that in the dimming laminate 10 according to the first embodiment. That is, the laminate 100C in Example 3 was evaluated on the assumption that the adhesive layer 122 made of ethylene vinyl acetate copolymer was used in place of the dimming function material 16 and regarded as the dimming function material 16.

The laminate 100D shown in FIG. 8D corresponds to a laminate in Example 4.

The laminate 100D in Example 4 is a laminate manufactured as follows. That is, two alkali free glasses (two first transparent substrates) 132 and 134 each having a thickness of 1.1 mm were laminated on each other through an adhesive layer 136 made of ethylene vinyl acetate copolymer (inter layer: EVA) and having a thickness of 0.8 mm, and one alkali free glass 132 and a soda lime glass (second transparent substrate) 138 having a thickness of 4 mm were laminated on each other through an adhesive layer 140 made of ethylene vinyl acetate copolymer (inter layer: EVA) and having a thickness of 0.8 mm, while the soda lime glass 138 and an alkali free glass (third transparent substrate) 142 having a thickness of 1.1 mm were laminated on each other through an adhesive layer 144 made of ethylene vinyl acetate copolymer (inter layer: EVA) and having a thickness of 0.8 mm. Those glasses were put into a rubber bag, and heated and depressurized therein. Thus, the laminate 100D in Example 4 was manufactured. Although the dimming function material 16 is absent, the amount of warpage is substantially equivalent to that in the dimming laminate 30 according to the second embodiment. That is, the laminate 100D in Example 4 was evaluated on the assumption that the adhesive layer 136 made of ethylene vinyl acetate copolymer was used in place of the dimming function material 16 and regarded as the dimming function material 16.

<Warp Measuring Places in Laminate>

Figure 9A:
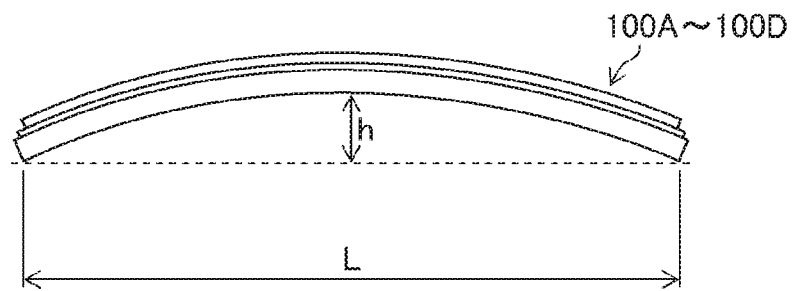
FIGS. 9A and 9B are views for explaining warpage measuring positions in each laminate.
Figure 9B:
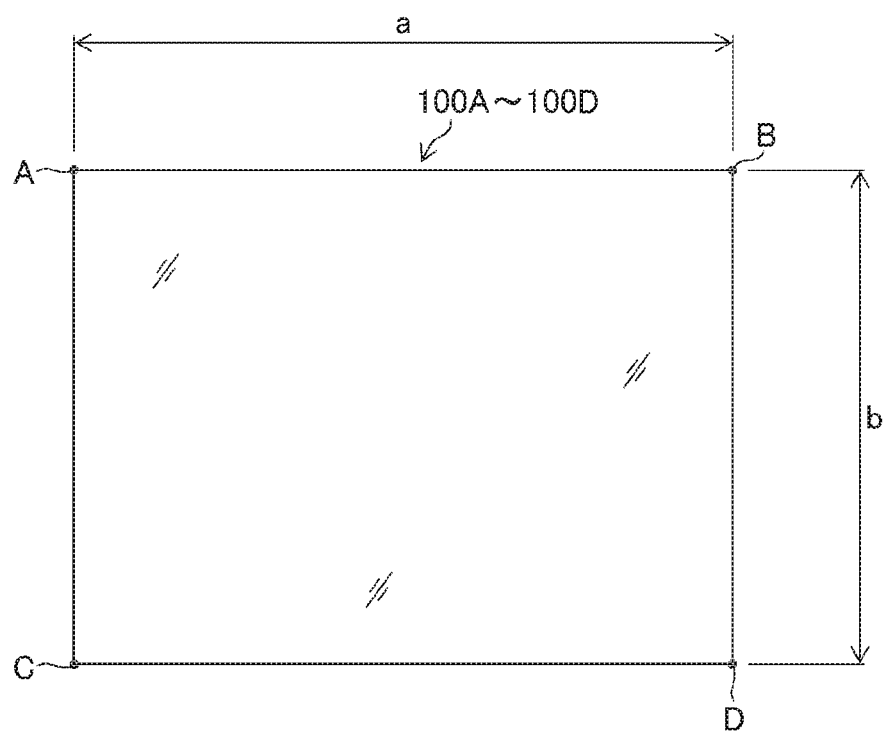

FIGS. 9A and 9B are views for explaining places where a warp of each laminate 100A-100D was measured. FIG. 9A is a side view of the laminate 100A-100D, and FIG. 9B is a plan view of the laminate 100A-100D. In addition, each laminate 100A-100D has a rectangular shape with a long side a having a length of 1,335 mm and a short side b having a length of 825 mm. Measuring positions were set in positions along lines L connecting apexes C-D, apexes A-C, apexes A-B, apexes B-D, apexes B-C, and apexes A-D. In addition, an evaluation value to be satisfied was set as h≤3.0 mm in each examination when a warp amount at each position is h (mm). Further, the warp amount h (mm) in each laminate 100A-100D was measured by a measuring method according to JIS (Japanese Industrial Standard) R3205:2005.

According to the examination results in FIG. 7, the laminate 100A in Comparative Example 1 satisfied h≤3.0 mm at the measuring positions A-C (2.0 mm) and B-D (2.0 mm), but could not satisfy h≤3.0 mm at the other measuring positions. The laminate 100A in Comparative Example 2 satisfied h≤3.0 mm at the measuring positions A-C (1.0 mm), A-B (2.5 mm) and B-D (1.0 mm), but could not satisfy h≤3.0 mm at the other measuring positions. The laminate 100B in Comparative Example 3 satisfied h≤3.0 mm at the measuring positions A-C (1.5 mm), A-B (3.0 mm) and B-D (1.0 mm), but could not satisfy h≤3.0 mm at the other measuring positions.

Further, the laminate 100A in Comparative Example 4 satisfied h≤3.0 mm at the measuring positions A-C (2.0 mm) and B-D (2.5 mm), but could not satisfy h≤3.0 mm at the other measuring positions. The laminate 100A in Comparative Example 5 satisfied h≤3.0 mm at the measuring positions A-C (3.0 mm) and B-D (3.0 mm), but could not satisfy h≤3.0 mm at the other measuring positions. In addition, the laminate 100A in Comparative Example 6 satisfied h≤3.0 mm at the measuring positions A-C (0.5 mm) and B-D (1.0 mm), but could not satisfy h≤3.0 mm at the other measuring positions.

On the other hand, the warp amount was zero at all the measuring positions in the laminate 100C in Example 1. In addition, the warp amount h (mm) was in a range of 0.5-1.5 mm at all the measuring positions in the laminate 100D in Example 2, satisfying h≤3.0 mm. In addition, the warp amount h (mm) was in a range of 0.0-0.5 mm at all the measuring positions in the laminate 100C in Example 3, satisfying h≤3.0 mm. Further, the warp amount h (mm) was in a range of 1.0-1.5 mm at all the measuring positions in the laminate 100D in Example 4, satisfying h≤3.0 mm.

As is clear from the aforementioned examination results, according to the dimming laminate 10 corresponding to the laminate 100C and the dimming laminate 30 corresponding to the laminate 100D, warpage occurring during manufacturing by heating treatment could be reduced on a large scale. Thus, it is possible to provide the dimming laminate 10 and the dimming laminate 30 with good quality.

Although the invention has been described in detail and with reference to its specific embodiments, it is obvious for those in the art that various changes or modifications can be made on the invention without departing from the spirit and scope thereof. The present application is based on a Japanese patent application (Japanese Patent Application No. 2016-114526) filed on Jun. 8, 2016, the contents of which are incorporated herein by reference.

DESCRIPTION OF REFERENCE NUMERALS AND SIGNS

10 . . . dimming laminate, 12, 14 . . . first transparent substrate, 16 . . . dimming function material, 18 . . . dimming substrate, 19 . . . dimming substrate unit, 20 . . . adhesive layer, 22 . . . second transparent substrate, 24 . . . adhesive layer, 26 . . . third transparent substrate, 30 . . . dimming laminate, 32 . . . third transparent substrate, 40 . . . multiple glass, 42 . . . glass plate, 44 . . . spacer, 46 . . . hollow layer, 48 . . . primary seal material, 50 . . . multiple glass, 52 . . . secondary seal material, 54 . . . drying material, 56 . . . Low-E film, 100A, 100B, 100C, 100D . . . laminate, 102 . . . soda lime glass, 104 . . . alkali free glass, 106 . . . adhesive layer, 108, 110 . . . alkali free glass, 112 . . . adhesive layer, 114 . . . soda lime glass, 116 . . . adhesive layer, 118, 120 . . . alkali free glass, 122 . . . adhesive layer, 124 . . . soda lime glass, 126 . . . adhesive layer, 128 . . . soda lime glass, 130 . . . adhesive layer, 132, 134 . . . alkali free glass, 136 . . . adhesive layer, 138 . . . soda lime glass, 140 . . . adhesive layer, 142 . . . alkali free glass, 144 . . . adhesive layer

The invention claimed is:

1. A dimming laminate comprising: a single dimming substrate in which a dimming function material is provided between two first transparent substrates; and a second transparent substrate that is bonded to one first transparent substrate of the two first transparent substrates through an adhesive layer, the first transparent substrates having a different average thermal expansion coefficient at 50-350° C. from that of the second transparent substrate,
   wherein a third transparent substrate is bonded to the other first transparent substrate of the two first transparent substrates through an adhesive layer, and a difference in average thermal expansion coefficient at 50-350° C. between the third transparent substrate and the second transparent substrate is not higher than $20 \times 10^{-7}$/° C.;
   wherein the dimming function material is a material whose optical property can be changed reversibly, and which is an electrochromic function material, an SPD (Suspended Particle Device) material, a liquid crystal material, a polymer dispersed liquid crystal material, a photochromic material, or a thermochromic material;
   wherein an alkali metal oxide content of each of the first transparent substrates is not higher than 0.1% in terms of mol % of oxides;
   wherein each of the first transparent substrates has an average thermal expansion coefficient at 50-350° C. of not higher than $45 \times 10^{-7}$/° C.;
   wherein the second transparent substrates has an average thermal expansion coefficient at 50-350° C. of $60 \times 10^{-7}$/° C. to $100 \times 10^{-7}$/° C.; and
   wherein the third transparent substrates has an average thermal expansion coefficient at 50-350° C. of $60 \times 10^{-7}$/° C. to $100 \times 10^{-7}$/° C.

2. The dimming laminate according to claim 1, wherein the average thermal expansion coefficient at 50-350° C. is equal between the third transparent substrate and the second transparent substrate.

3. The dimming laminate according to claim 2, wherein the average thermal expansion coefficient at 50-350° C. in each of the third transparent substrate and the second transparent substrate is higher than the average thermal expansion coefficient at 50-350° C. in each of the first transparent substrates.

4. The dimming laminate according to claim 1, wherein a difference in average thermal expansion coefficient at 50-350° C. between the two first transparent substrates is not higher than $10 \times 10^{-7}$/° C.

5. The dimming laminate according to claim 1, wherein the average thermal expansion coefficient at 50-350° C. is equal between the two first transparent substrates.

6. A multiple glass in which the dimming laminate of claim 1 and a glass plate are put separately from each other through a spacer, and circumferential edge portions of the dimming laminate of claim 1 and the glass plate are sealed with a seal material.

7. The dimming laminate according to claim 1, wherein each of the first transparent substrates has a thickness of 0.1-2.0 mm.

8. The dimming laminate according to claim 1, wherein each of the second transparent substrate and the third transparent substrate has a thickness of 1.0-12.0 mm.

9. The dimming laminate according to claim 8, wherein each of the second transparent substrate and the third transparent substrate has a thickness of 2.0 mm or more.

10. The dimming laminate according to claim 8, wherein each of the second transparent substrate and the third transparent substrate has a thickness of 1.0 mm or more.

11. The dimming laminate according to claim 1, wherein each of the second transparent substrate and the third transparent substrate is a soda lime glass.

12. The dimming laminate according to claim 1, wherein each of the adhesive layers is sheet-like member and has a thickness of 0.1-2.0 mm.

13. The dimming laminate according to claim 1, wherein a difference in thickness between the two first transparent substrates is 1 mm or less, and a difference in thickness between the second transparent substrate and the third transparent substrate is 1 mm or less.

14. The dimming laminate according to claim 1, wherein each of the first transparent substrates has an average thermal expansion coefficient at 50-350° C. of not higher than $40 \times 10^{-7}$/° C.

* * * * *

UNITED STATES PATENT AND TRADEMARK OFFICE
CERTIFICATE OF CORRECTION

PATENT NO. : 11,119,378 B2  
APPLICATION NO. : 16/209963  
DATED : September 14, 2021  
INVENTOR(S) : Shigeru Nakamura and Tetsuya Hiramatsu Page 1 of 1

It is certified that error appears in the above-identified patent and that said Letters Patent is hereby corrected as shown below:

In the Claims

Claim 10, Column 17, Line 3:
Please delete:
"transparent substrate has a thickness of 1.0 mm or more."
Please replace with:
transparent substrate has a thickness of 3.0 mm or more.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*